United States Patent
Collart et al.

(10) Patent No.: US 10,275,599 B2
(45) Date of Patent: Apr. 30, 2019

(54) DEVICE AND METHOD FOR PROVIDING TRUSTED PLATFORM MODULE SERVICES

(71) Applicant: Proton World International N.V., Diegem (BE)

(72) Inventors: Olivier Collart, Sart-Dames-Avelines (BE); Benedicte Moriau, Sart-Dames-Avelines (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 0 days.

(21) Appl. No.: 14/674,761

(22) Filed: Mar. 31, 2015

(65) Prior Publication Data
US 2016/0050071 A1    Feb. 18, 2016

(30) Foreign Application Priority Data

Aug. 18, 2014 (FR) .................. 1457855

(51) Int. Cl.
G06F 21/57 (2013.01)
G06F 12/14 (2006.01)
H04L 9/32 (2006.01)

(52) U.S. Cl.
CPC ........ G06F 21/575 (2013.01); G06F 12/1408 (2013.01); G06F 21/57 (2013.01);
(Continued)

(58) Field of Classification Search
CPC ....... G06F 21/57; G06F 21/575; H04L 9/3234
See application file for complete search history.

(56) References Cited

U.S. PATENT DOCUMENTS 8,522,018 B2 * 8/2013 Molina .................. H04L 63/08
  709/203
8,608,057 B1 * 12/2013 Crews ..................... G06F 21/57
  235/379

(Continued)

FOREIGN PATENT DOCUMENTS

CN       103597493 A    2/2014
CN       204990315 U    1/2016
(Continued)

OTHER PUBLICATIONS

Lin, Kuan-Jen; Wang, Chin-Yi; "Using TPM to Improve Boot Security at BIOS Layer", International Conference on Consumer Electronics (ICCE), IEEE, Jan. 13-16, 2012, pp. 376-377.*

(Continued)

*Primary Examiner* — Victor Lesniewski
(74) *Attorney, Agent, or Firm* — Seed IP Law Group LLP

(57) ABSTRACT

The invention concerns a circuit having a first processing device which has one or more first platform configuration registers for storing one or more data values based on boot measurements relating to a boot sequence implemented by the first processing device. The first processing device also has a secure element, which has its own processing device and one or more second platform configuration registers. The first and second platform configuration registers are coupled together via a communications interface adapted to copy the one or more data values from the one or more first platform configuration registers to the one or more second platform configuration registers.

20 Claims, 2 Drawing Sheets

(52) U.S. Cl.
CPC .... *H04L 9/3234* (2013.01); *G06F 2212/1052* (2013.01); *G06F 2221/2115* (2013.01)

(56) References Cited

U.S. PATENT DOCUMENTS

| | | | | |
|---|---|---|---|---|
| 9,294,282 | B1* | 3/2016 | Potlapally | H04L 9/3236 |
| 2003/0074548 | A1* | 4/2003 | Cromer | G06F 21/575 |
| | | | | 713/1 |
| 2006/0112267 | A1* | 5/2006 | Zimmer | G06F 21/57 |
| | | | | 713/164 |
| 2006/0212939 | A1* | 9/2006 | England | G06F 21/57 |
| | | | | 726/22 |
| 2006/0230439 | A1* | 10/2006 | Smith | G06F 21/57 |
| | | | | 726/9 |
| 2007/0136577 | A1* | 6/2007 | Bade | G06F 21/57 |
| | | | | 713/164 |
| 2008/0046581 | A1* | 2/2008 | Molina | H04L 63/08 |
| | | | | 709/229 |
| 2008/0046752 | A1* | 2/2008 | Berger | H04L 9/3271 |
| | | | | 713/186 |
| 2008/0077993 | A1* | 3/2008 | Zimmer | G06F 9/5077 |
| | | | | 726/27 |
| 2008/0148064 | A1* | 6/2008 | Challener | G06F 21/57 |
| | | | | 713/189 |
| 2010/0082984 | A1* | 4/2010 | Ellison | G06F 21/57 |
| | | | | 713/170 |
| 2010/0235648 | A1* | 9/2010 | Hoang | G06F 21/575 |
| | | | | 713/189 |
| 2011/0040961 | A1* | 2/2011 | Badaoui-Najjar | G06F 21/57 |
| | | | | 713/2 |
| 2011/0138475 | A1* | 6/2011 | Gordon | H04L 9/085 |
| | | | | 726/26 |
| 2011/0276795 | A1* | 11/2011 | Nicolson | G06F 21/575 |
| | | | | 713/2 |
| 2011/0302425 | A1* | 12/2011 | Saripalli | H04L 41/044 |
| | | | | 713/189 |
| 2012/0246470 | A1* | 9/2012 | Nicolson | G06F 21/51 |
| | | | | 713/158 |
| 2012/0297175 | A1* | 11/2012 | Ekberg | G06F 21/575 |
| | | | | 713/1 |
| 2012/0311315 | A1* | 12/2012 | Ekberg | G06F 21/57 |
| | | | | 713/2 |
| 2013/0159704 | A1* | 6/2013 | Chandrasekaran | G06F 21/57 |
| | | | | 713/156 |
| 2013/0174220 | A1* | 7/2013 | Berg | H04W 12/10 |
| | | | | 726/3 |
| 2013/0198838 | A1* | 8/2013 | Schmidt | H04L 9/3234 |
| | | | | 726/22 |
| 2013/0218915 | A1* | 8/2013 | Billau | H04W 12/10 |
| | | | | 707/755 |
| 2013/0276057 | A1* | 10/2013 | Smith | G06F 21/00 |
| | | | | 726/1 |
| 2014/0013327 | A1* | 1/2014 | Sherwood | G06F 9/45533 |
| | | | | 718/1 |
| 2014/0025939 | A1* | 1/2014 | Smith | G06F 9/24 |
| | | | | 713/2 |
| 2014/0115316 | A1 | 4/2014 | Owen | |
| 2014/0130124 | A1* | 5/2014 | Ekberg | G06F 21/57 |
| | | | | 726/2 |
| 2015/0242656 | A1* | 8/2015 | Dasari | G06F 21/57 |
| | | | | 713/189 |

FOREIGN PATENT DOCUMENTS

| | | | | |
|---|---|---|---|---|
| EP | 2063358 A2 | 11/2008 | | |
| WO | WO 2012087562 A2 * | 6/2012 | ............ | G06F 21/10 |

OTHER PUBLICATIONS

Kai, Tang; Xin, Xu; Guo, Chunxia; "The Secure Boot of Embedded System Based on Mobile Trusted Module", Second International Conference on Intelligent System Design and Engineering Application, IEEE, Jan. 6-7, 2012, pp. 1331-1334.*

Khalid, Obaid; Rolfes, Carsten; Ibing, Andreas; "On Implementing Trusted Boot for Embedded Systems", International Symposium on Hardware-Oriented Security and Trust (HOST), IEEE, Jun. 2-3, 2013, pp. 75-80.*

Ekberg et al., "Trust in a Small Package, Minimized MRTM Software Implementation for Mobile Secure Environments," STC'09, Nov. 13, 2009, 10 pages.

* cited by examiner

DEVICE AND METHOD FOR PROVIDING TRUSTED PLATFORM MODULE SERVICES

CROSS-REFERENCE TO RELATED APPLICATION(S)

This application claims the priority benefit of French Patent application number 14/57855, filed on Aug. 18, 2014, the content of which is hereby incorporated by reference in its entirety to the maximum extent allowable by law.

BACKGROUND

Technical Field

The present disclosure relates to the field of methods and devices for providing trusted platform module (TPM) services, without using a dedicated TPM device.

Description of the Related Art

In order to provide the authenticity and security of hardware and software configurations, it has been proposed to use a trusted platform module (TPM). A TPM is a cryptographic device for enabling trusted computing. One key requirement of a trusted computing environment is to ensure the integrity of the boot sequence. To do this, the TPM forms a "root of trust". In particular, from power-on of a computing device, the boot sequence starts from a trusted condition, and this trust is extended until the operating system has fully booted and applications are running. The integrity is ensured at each step by using one or more platform configuration registers (PCRs) of the TPM to securely store boot measurements. The contents of the PCRs can then be cryptographically signed by the TPM and provided to an application or remote party such that the integrity of the boot sequence can be verified.

Trusted platform modules may be incorporated into a wide range of electronic computing devices, including smartphones, tablet computers and laptop computers. They are generally implemented as hardware devices coupled to the main processor of the electronics device.

However, due to limits on available chip area and power, for many applications such as smartphones or other portable devices, there is a need for a solution for providing TPM services without using a dedicated TPM device. There are, however, technical difficulties in providing such a system while providing high security and fast response times.

BRIEF SUMMARY

Embodiments of the present disclosure at least partially address one or more needs in the prior art.

According to one aspect, there is provided a circuit comprising: a first processing device including one or more first platform configuration registers storing one or more data values based on boot measurements relating to a boot sequence implemented by the first processing device; and a secure element including a second processing device and one or more second platform configuration registers, the first and second platform configuration registers being coupled together via a communications interface adapted to copy the one or more data values from the one or more first platform configuration registers to the one or more second platform configuration registers.

According to one embodiment, the secure element is further adapted to implement at least one cryptographic function for authentication of a user of the circuit.

According to one embodiment, the first processing device comprises a trusted execution environment in which the one or more first platform configuration registers are stored.

According to one embodiment, the circuit further comprises a memory storing one or more first software applications adapted to verify the integrity of the boot sequence based on the one or more data values.

According to one embodiment, the secure element further comprises a memory storing one or more second software applications for facilitating the transmission of the one or more boot measurements to the one or more first software applications.

According to one embodiment, the circuit further comprises one or more drivers for facilitating the transmission of the one or more boot measurements to the one or more first software applications.

According to one embodiment, the secure element is adapted to cryptographically sign the one or more data values and to provide the cryptographically signed data values to a requesting element.

According to one embodiment, the secure element comprises a memory storing a third software application executable by the second processing device for cryptographically signing the one or more data values.

According to one embodiment, the circuit is adapted to authorize or refuse one or more transactions based on said one or more data values.

According to a further aspect, there is provided a smartphone comprising the above circuit.

According to a further aspect, there is provided a method of verifying the integrity of a boot sequence comprising: implementing a boot sequence by a first processing device; storing, in one or more first platform configuration registers of the first processing device, one or more data values based on boot measurements relating to the boot sequence; transferring one or more data values from the one or more first platform configuration registers to one or more second platform configuration registers of a secure element having a second processing device, the first and second platform configuration registers being coupled together via a communications interface.

According to one embodiment, the method further comprises: requesting, by a first software application, the one or more data values; cryptographically signing the one or more data values by the secure element; and providing, by the secure element, the one or more cryptographically signed data values to the first software application.

BRIEF DESCRIPTION OF THE SEVERAL VIEWS OF THE DRAWINGS

The foregoing and other features and advantages will become apparent from the following detailed description of embodiments, given by way of illustration and not limitation. Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
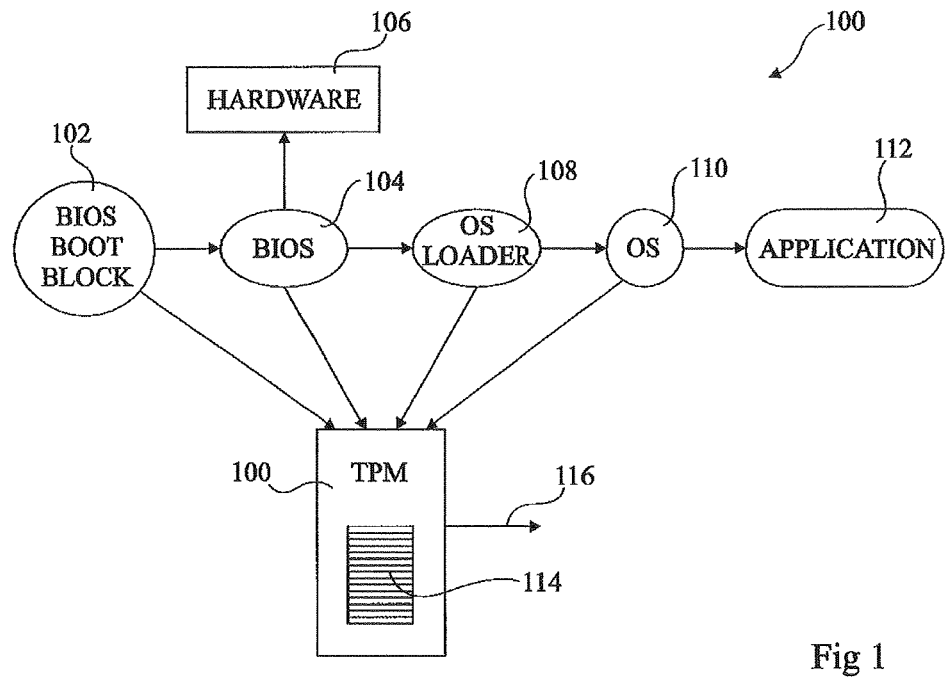
FIG. 1 schematically illustrates services provided by TPM according to an example embodiment.

FIG. 1 schematically represents a TPM system 100 implementing a process of platform integrity verification provided by a Trusted Platform Module (TPM) implemented in this example by a dedicated cryptographic device 100.

A BIOS (basic input output system) boot block (BIOS BOOT BLOCK) 102 for example comprises a non-volatile memory such as a ROM, and provides a root of trust for integrity verification. As represented by an arrow between the BIOS boot block 102 and the TPM 100, one or more boot measurements corresponding to the BIOS boot block 102 may be transmitted to the TPM 100.

Nodes 104, 108, 110 and 112 in FIG. 1 represent software that is loaded to volatile memory, such as a RAM (random access memory), during the boot sequence. The BIOS boot block 102 for example causes a BIOS 104 to be loaded into a volatile memory. As represented by an arrow between the BIOS 104 and the TPM 100, one or more boot measurements associated with the loading of the BIOS 102 may be transmitted to the TPM 100 by the BIOS 102. Furthermore, one or more auxiliary hardware components (HARDWARE) 106 included in the platform, such as a graphics card, a controller managing the platform connectivity or a cryptographic coprocessor, may also be booted in response to the loading of the BIOS 104. The microcode running on these components may also be measured and transmitted to the TPM.

An operating system loader (OS LOADER) 108 is then for example loaded from non-volatile memory to volatile memory, and again one or more boot measurements may be transmitted to the TPM 100.

An operating system (OS) 110 is then for example loaded from non-volatile memory to volatile memory, and again one or more boot measurements may be transmitted to the TPM 100.

One or more software applications (APPLICATION) 112 are then for example loaded from non-volatile memory, and again one or more boot measurements may be transmitted to the TPM 100.

The trusted platform module 100 comprises a bank 114 of one or more platform configuration registers (PCRs), and the boot measurements generated during the boot sequence are stored in this register bank. Generally, after reset, the PCR bank 114 stores a null value, and the boot measurements can for example only be stored in the PCR bank 114 using an "extend" instruction to extend the contents of the PCR bank. At the end of the boot sequence, the one or more PCRs 114 for example each contain a digest of the chained measurements of the booted software. In one example, each measurement transmitted to a specific PCR updates the PCR value with the formula PCR_NEW=H(PCR_OLD+M), where PCR_NEW is the updated PCR value, PCR_OLD is the previous PCR value, M is the measurement, and H( ) is a digest function. Thus the final PCR value at the end of the boot process is a digest of all measurements transmitted to the TPM. This final PCR value can only be reached by transmitting to the PCR the same specific measurements in the same order.

The TPM 100 for example comprises cryptographic functions that allow the measurements stored in the PCR bank 114 to be cryptographically signed. As represented by an arrow 116, the cryptographically signed measurements may be provided to one or more requesting parties, such as the operating system 110 and/or one of the applications 112, in order to verify the integrity of the boot sequence.

Figure 2:
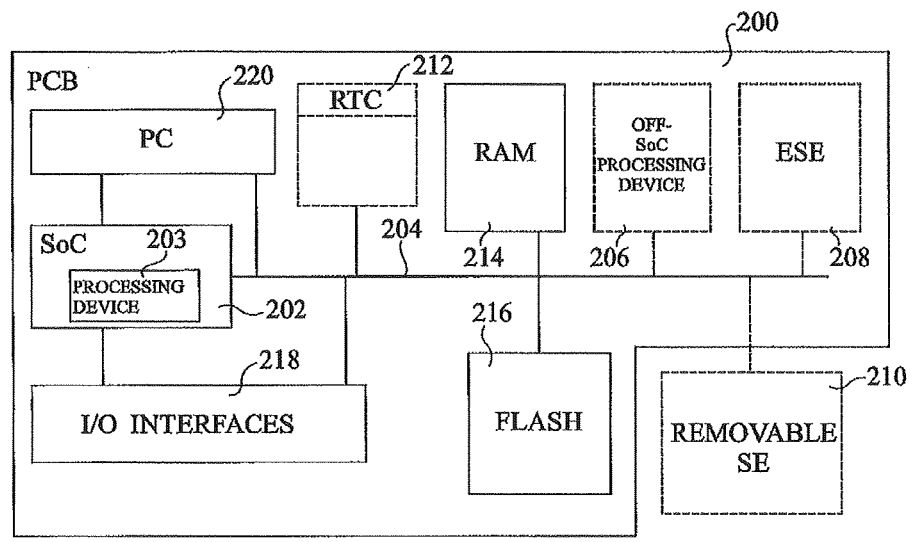
FIG. 2 schematically illustrates a printed circuit board of a computing device according to an example embodiment.

FIG. 2 schematically illustrates a substrate, such as a printed circuit board (PCB) 200, in which TPM (trusted platform module) services may be provided.

The PCB 200 includes a system on chip (SoC) 202, which comprises a processing device (PROCESSING DEVICE) 203. As will be described in more detail below, the processing device 203 for example includes a trusted execution environment permitting processing and storage of sensitive data. Herein, the term "sensitive data" is used to designate any data that should remain inaccessible to unauthorized parties.

The SoC 202 is for example coupled to a bus 204 via which processing device 203 of the SoC 202 may communicate with other optional hardware blocks. In the example of FIG. 2, the PCB 200 further comprises an off-chip SoC processing device (OFF-SoC PROCESSING DEVICE) 206, coupled to the bus 204, which is for example a cryptographic co-processor. Device 206 is for example adapted to execute functions not supported by the SoC, such as cryptographic functions. As with the processing device 203 of the SoC 202, the processing device 206 may include a trusted execution environment permitting processing and storage of sensitive data. However, as will become apparent from the description hereafter, the device 206 may advantageously be omitted thanks to the new functions of the processing device 203 and the secure element 208 and/or 210.

The PCB 200 also for example comprises an embedded secure element (ESE) 208 and/or a removable secure element (REMOVABLE SE) 210, each coupled to the bus 204. As known to those skilled in the art, an embedded or removable secure element provides cryptographic functions for authenticating a user of the circuit and/or for performing other operations such as signature generation.

A real time clock (RTC) 212 is also coupled to the bus 204 and may provide time information to platform services.

The PCB 200 also for example comprises a volatile memory 214, such as RAM (random access memory), and/or a non-volatile memory 216, such as FLASH memory 216, coupled to the bus 204. The PCB 200 may also comprise one or more input/output interfaces (I/O INTERFACES) 218 coupled to the SoC 202 and to the bus 204, which for example include video drivers, keyboards, touch screens, etc. The PCB 200 may further comprise a power control circuit (PC) 220, coupled to the SoC 202 and to the bus 204, which controls power-down and power-up of the SoC 202 and/or one or more other devices on the PCB 200.

As will be described in more detail below, rather than having a dedicated TPM device, TPM services provided in the system 100 of FIG. 1 are shared between the processing device 203 and one or both of the secure elements 208 and 210.

Figure 3:
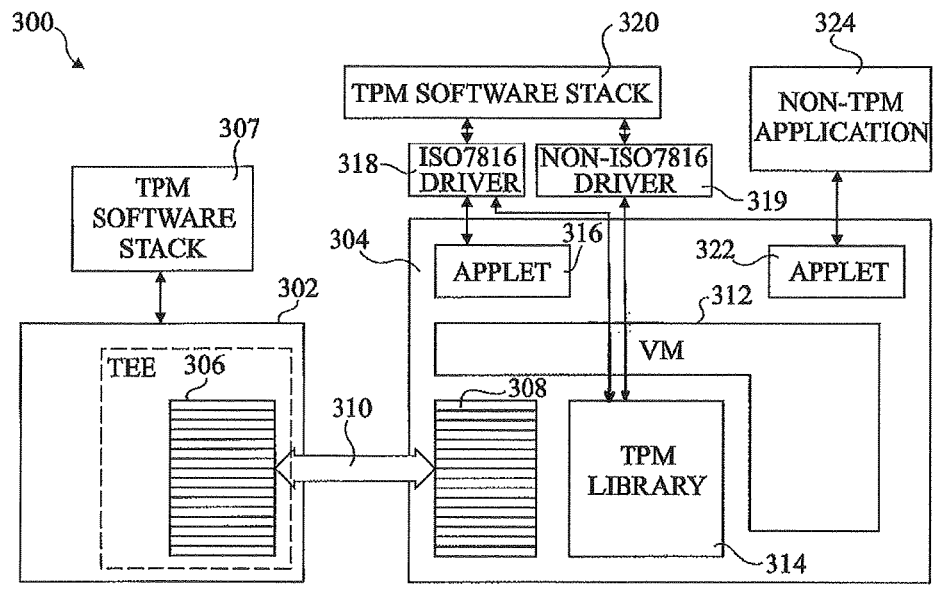
FIG. 3 schematically illustrates a portion of a computing device for providing TPM services according to an example embodiment of the present disclosure.

FIG. 3 schematically illustrates a portion 300 of a computing device in which the functions of a TPM are implemented by a main processing device 302 and a secure element 304 of electronics device. In particular, the implementation of FIG. 3 for example permits at least the verification of the integrity of a boot sequence. The main processing device 302 is for example the processing device implementing the boot sequence of the device, such as the processing device 203 of the SoC 202 in FIG. 2. The secure element 304 could be an embedded secure element, like the element 208 of FIG. 2, or a removable secure element, like the element 210 of FIG. 2.

The processing device 302 includes one or more platform configuration registers in a bank 306, which are for example held within a trusted execution environment (TEE) of the processing device 302. As known by those skilled in the art, a TEE includes hardware and software for isolating certain data and operations from other parts of the device in order to provide security against software attacks.

The TPM functionality of the processing device 302, which will be discussed in more detail below, is for example controlled by a TPM software stack (TPM SOFTWARE STACK) 307, which also provides TPM services to applications running on the platform.

The PCR bank 306 is for example adapted to receive boot measurements generated during the boot sequence of the processing device 302. These measurements for example correspond to code measurements made during platform boot. The boot measurements for example concern the loading of a BIOS, an operating system, and/or one or more applications. In some embodiments, boot measurements may also be generated in relation to the loading of one or more hardware drivers, thereby adding security to the operation of such hardware. For example, the boot measurements may concern the loading of a display driver, keyboard driver and/or modem driver, in order to add security to the display of data, to protect data entered by a user, and/or to protect transaction data.

The secure element 304 comprises one or more further PCR banks 308. A connection 310, authenticated using physical or logical protections, links the processing device 302 and the secure element 304, and in particular couples the PCR bank 306 to the PCR bank 308 to allow data to/from the PCR bank 306 to be transferred from/to the PCR bank 308. In some embodiments, a transfer is performed each time the PCR bank 306 is extended, such that the PCR bank 308 is constantly maintained up-to-date. Alternatively, the PCR bank 308 is for example synchronized only once at the end of the platform boot process, once the PCR bank 306 has received all measurements made by the processing device 302. Indeed, in some cases, the secure element 304 may not be available as quickly as the processing device 302 during the boot process.

The secure element 304 for example comprises various functional blocks represented in FIG. 3, which are for example implemented in software executed by a processing device of the secure element (not illustrated in FIG. 3). In particular, the secure element comprises a virtual machine (VM) 312 providing services to applications (applets). In the example of FIG. 3, the software architecture of the secure element for example includes the virtual machine 312 in order to allow independent application providers to load applets, the virtualization providing a firewall between applets and avoiding conflicts between applets. The secure element 304 also comprises a TPM library (TPM LIBRARY) 314, called by the virtual machine, and which comprises code for controlling TPM data and providing TPM services to the virtual machine 312. TPM data includes encryption keys cryptographically signing the contents of the PCR bank 308, and/or other relevant data.

The applets of the secure element 304 support communications between the secure element 304 and one or more other elements that may request verification of the integrity of the boot sequence implemented by the processing device 302. For example, the secure element 304 comprises a Java Card (JC) applet 316 supporting an ISO 7816 communications protocol allowing communications via an ISO 7816 driver (ISO7816 DRIVER) 318 with a TPM software stack (TPM SOFTWARE STACK) 320, which may be the same as the software stack 307. The standard TPM commands sent by the TPM software stack to the TPM are wrapped by the driver and unwrapped by the Java Card applet 316. Once the commands are unwrapped, the Java Card applet 316 can process the TPM commands through the Virtual Machine service by the TPM library 314.

As represented by an arrow directly between the driver 318 and the TPM library 314, the TPM library 314 may additionally or alternatively provide TPM services to the software stack 320 via the driver 318 without using the virtual machine layer (applet 316).

Furthermore, a non-ISO 7816 driver (NON-ISO7816 DRIVER) 319 may be provided between the TPM library 314 and the TPM software stack 320 in addition to or instead of the driver 318. No applet is used in this example between the TPM library 314 and the driver 319. The hardware configuration for example uses an SPI (serial peripheral interface) bus or an SWP (single wire protocol) bus between the TPM library 314 and the driver 318 and/or the driver 319, the bus or buses for example being shared with the processing device 302.

Additionally or alternatively, the secure element 304 may store a Java Card applet (APPLET) 322 permitting communications with an application 324 using non-standard TPM commands. For example, the integrity verification provided by the data of PCR bank 308 could be used for a range of applications, for example as part of an authentication process. In one embodiment, a digital signature is generated by the secure element 304 for authenticating a financial transaction, such as the amount, currency and/or destination account. Such a signature for example additionally comprises data of the PCR bank 308, and this data is verified before authorizing the transaction.

Operation of the circuit of FIG. 3 will now be described in more detail with reference to the flow diagram of FIG. 4.

Figure 4:
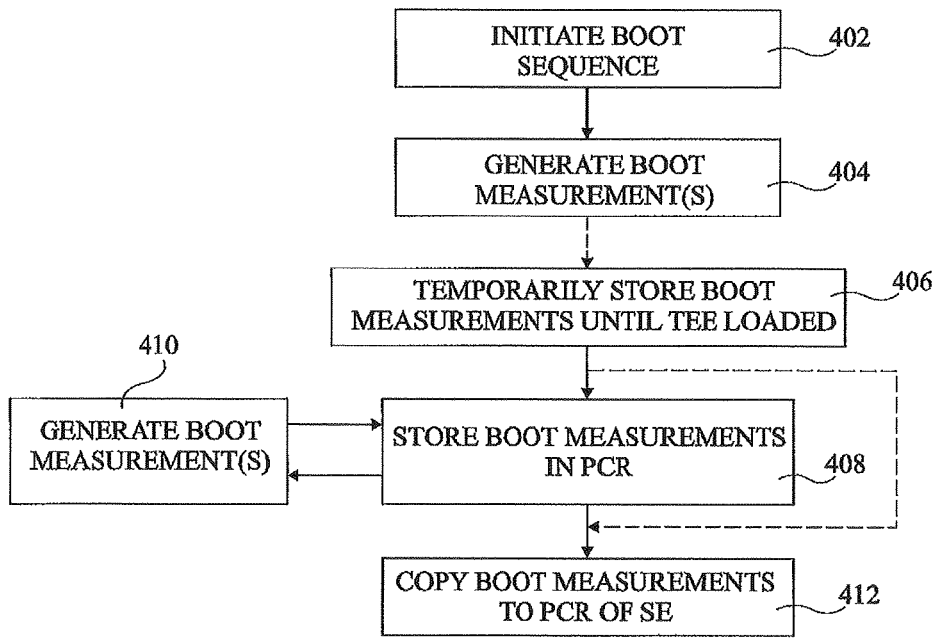
FIG. 4 is a flow diagram illustrating operations in a method of verifying the integrity of a boot sequence according to an example embodiment of the present disclosure.

In a first operation 402 of FIG. 4, a boot sequence of the processing device is initiated. This for example follows a power-down period of the portion 300 of the computing device of FIG. 3, and the boot sequence is for example automatically launched upon power-up.

In a subsequent operation 404, one or more boot measurement(s) are generated during the boot sequence.

In some embodiments, the PCR are stored in a TEE, which is not immediately available at the start of the boot sequence. In such a case, as shown in an operation 406, until TEE has been loaded, these boot measurements may be temporarily stored by the processing device 302, and/or some measurements may be transmitted directly to the secure element 304 to be stored in the PCR bank 308 as represented by a dashed arrow from operation 406 to an operation 412 discussed below.

In a subsequent operation 408, boot measurements are transmitted to the PCR bank 306 of the processing device 302, for example in a TEE. The boot measurements are stored in the PCRs as PCR values calculated based on the boot measurements. As represented by a block 410, one or more further boot measurements may be generated during the boot sequence, and added to the PCR 306 in operation 408.

Furthermore, periodically each time a new boot measurement is transmitted to the PCR 306, or at the end of a boot sequence once all measurements have been taken, the boot measurements are copied to the PCR bank 308 of the secure element 304. As described above, the boot measurements can then be cryptographically signed and used during a verification of the integrity of the boot sequence.

While not illustrated in FIG. 4, the verification of the integrity of the boot sequence for example involves comparing one or more boot measurements with a reference value. If the boot measurements match the reference value, the boot sequence is for example considered to be valid.

Advantageously in the embodiments described herein, functions of a TPM are implemented using PCRs of both the processing device executing the boot sequence and a secure element, and the boot measurements are transferred via a secure connection between the two PCR banks. In this way, the PCRs of the processing device can be available very rapidly during the boot sequence, and the PCRs of the secure element can provide a very secure interface with other elements requesting access to the boot measurements.

Having thus described at least one illustrative embodiment, various alterations, modifications and improvements will readily occur to those skilled in the art.

For example, it will be apparent to those skilled in the art that, while embodiments have been described in which the PCR of the processing device is stored in a TEE to provide additional security, such a feature is optional.

Furthermore, it will be apparent to those skilled in the art that the various features described in relation to the various embodiments could be combined, in alternative embodiments, in any combination.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
    a first processing device including one or more hardware-based first platform configuration registers, the one or more hardware-based first platform configuration registers configured to store boot measurement data values associated with a boot sequence implemented by the first processing device;
    a secure element, the secure element including a second processing device and one or more hardware-based second platform configuration registers; and
    an authenticated communications interface coupling the one or more hardware-based first platform configuration registers and the one or more hardware-based second platform configuration registers together, the authenticated communications interface being a physically fixed communications interface, the authenticated communications interface adapted to copy the boot measurement data values, as each boot measurement data value is generated, between the one or more hardware-based first platform configuration registers and the one or more hardware-based second platform configuration registers, wherein both the first processing device and the secure element are contained in a single computing device, wherein the copying maintains the boot measurement data values in the one or more hardware-based first platform configuration registers and the one or more hardware-based second platform configuration registers, wherein the secure element is adapted to generate a digital signature for authenticating a financial transaction, said digital signature generated by cryptographically signing the boot measurement data values copied to the one or more hardware-based second platform configuration registers, and used to verify the integrity of the boot sequence implemented by the first processing device.

2. The circuit of claim 1, wherein the secure element is adapted to implement a cryptographic function to authenticate a user of the circuit.

3. The circuit of claim 1, wherein the one or more first platform configuration registers are arranged in a trusted execution environment of the first processing device.

4. The circuit of claim 1, further comprising:
    a memory to store a first software application adapted to verify the integrity of the boot sequence based on the boot measurement data values.

5. The circuit of claim 4, wherein the secure element comprises:
    a memory to store a second software application adapted to facilitate transmission of the boot measurement data values to the first software application.

6. The circuit of claim 4, further comprising:
    one or more drivers to facilitate transmission of the boot measurement data values to the first software application.

7. The circuit of claim 1, wherein the secure element is adapted to cryptographically sign at least one of the boot measurement data values and to provide the cryptographically signed at least one of the boot measurement data values to a requesting element.

8. The circuit of claim 7, wherein the secure element comprises:
    a memory to store a third software application executable by the second processing device, the third software application adapted to cryptographically sign the at least one of the boot measurement data values.

9. The circuit of claim 1, wherein the first processing device or the secure element is adapted to authorize or refuse a transaction based on at least one of the boot measurement data values.

10. The circuit of claim 1, wherein the circuit is arranged within a smartphone.

11. A method to verify integrity of a boot sequence, comprising:
    implementing a boot sequence by a first processing device;
    storing, within a first set of hardware-based platform configuration registers of the first processing device, at least one data value representative of boot measurements generated during the boot sequence;
    upon generation of each boot measurement, maintaining the at least one data value in both the first set of hardware-based platform configuration registers and a second set of hardware-based platform configuration registers of a secure element by transferring the at least one data value from the first set of hardware-based platform configuration registers to the second set of hardware-based platform configuration registers of the secure element via an authenticated, physically fixed communications interface that couples together the first and second sets of hardware-based platform configuration registers, the secure element having a second processing device, wherein both the first processing device and the secure element are contained in a single computing device; and
    generating a digital signature for authenticating a financial transaction, said digital signature generated by cryptographically signing the at least one data value transferred to the second set of hardware-based platform configuration registers, and used to verify the integrity of the boot sequence implemented by the first processing device.

12. The method of claim 11, further comprising:
requesting, by a first software application, the at least one data value;
cryptographically signing the at least one data value by the secure element; and
providing, by the secure element, the cryptographically signed at least one data value to the first software application.

13. The method of claim 12, further comprising:
verifying, by the first software application, integrity of the boot sequence based on the at least one data value.

14. The method of claim 12, further comprising:
communicating the cryptographically signed at least one data value to the first software application via a second software application.

15. The method of claim 11, further comprising:
temporarily storing the at least one data value;
loading a trusted execution environment, the first set of platform configuration registers associated with the trusted execution environment;
copying the temporarily stored at least one data value into the first set of platform configuration registers.

16. The method of claim 11, wherein the boot sequence includes booting a smartphone.

17. The method of claim 11, further comprising:
sequentially generating additional data values representative of additional boot measurements generated during the boot sequence.

18. A system, comprising:
a first set of hardware-based platform configuration registers;
a second set of hardware-based platform configuration registers;
an authenticated communications interface coupling the first set of hardware-based platform configuration registers and the second set of hardware-based platform configuration registers together, the authenticated communications interface being a physically fixed communications interface;
a secure element associated with the second set of hardware-based platform configuration registers, the secure element configured to perform a cryptographic operation on data stored in the second set of hardware-based platform configuration registers; and
a first processing device associated with the first set of hardware-based platform configuration registers and communicatively coupled to the secure element, the first processing device configured to store boot measurement data values associated with a boot sequence in the first set of hardware-based platform configuration registers, wherein the boot measurement data values are chained to form a digest of measurements representative of the boot sequence, wherein both the first processing device and the secure element are contained in a single computing device, wherein the system is configured to transfer the boot measurement data values as each boot measurement data value is generated to maintain the boot measurement data values in both the first and second sets of hardware-based platform configuration registers, wherein the secure element is adapted to generate a digital signature for authenticating a financial transaction, said digital signature generated by cryptographically signing the boot measurement data values transferred to the second set of hardware-based platform configuration registers, and used to verify the integrity of the boot sequence implemented by the first processing device.

19. The system of claim 18, wherein the system includes components of a smartphone.

20. The system of claim 18, wherein the first processing device is further configured to pass at least some of the boot measurement data values to the secure element for storage in the second set of platform configuration registers.

* * * * *